(No Model.) J. S. WATTERS. 2 Sheets—Sheet 1.
BALING AND WEIGHING SCALE.
No. 454,953. Patented June 30, 1891.
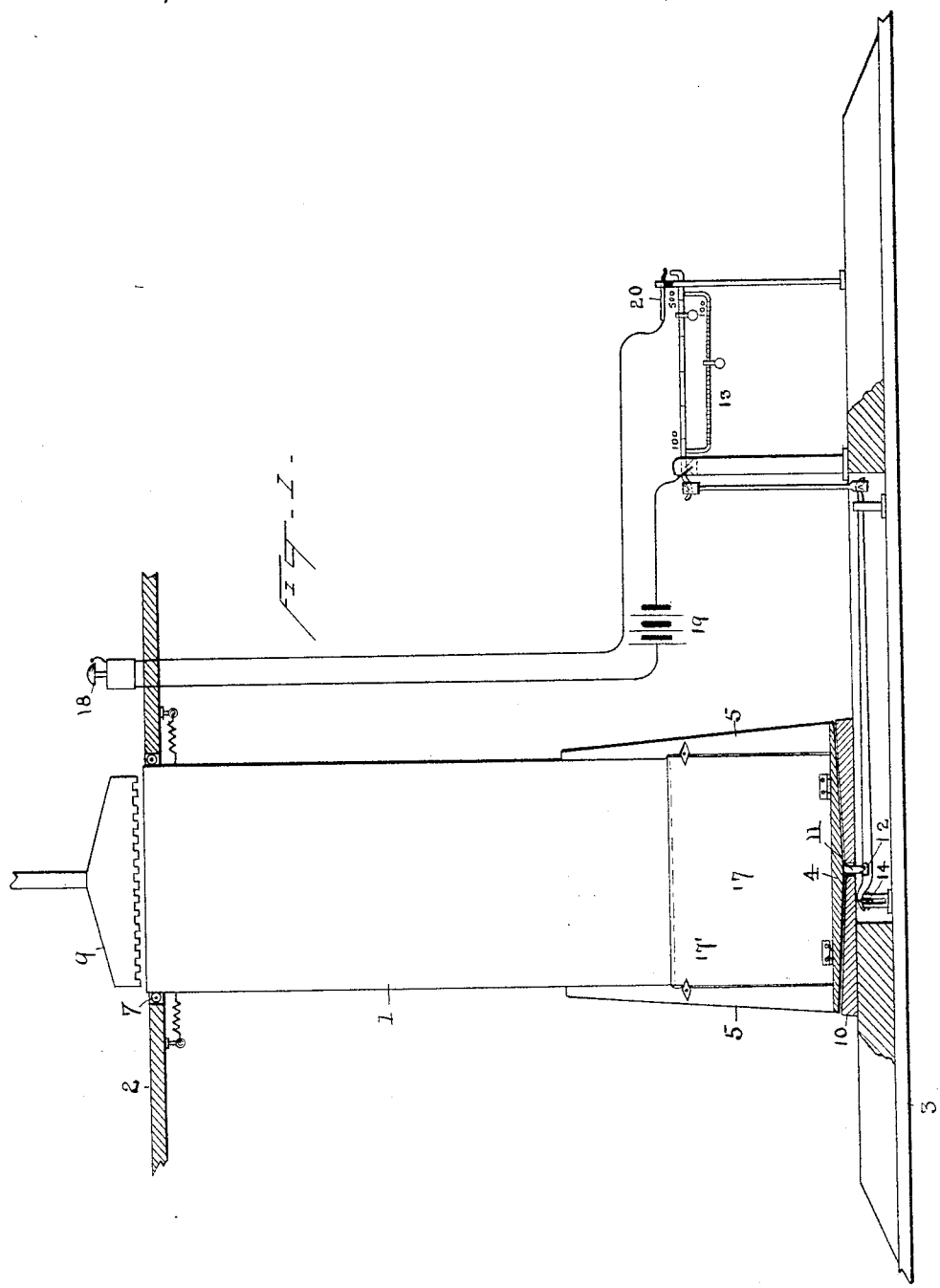
Witnesses
Norris A. Clark
Inventor
J. S. Watters.
By his Attorneys
Dyer & Seely.

(No Model.) J. S. WATTERS. 2 Sheets—Sheet 2.
BALING AND WEIGHING SCALE.
No. 454,953. Patented June 30, 1891.
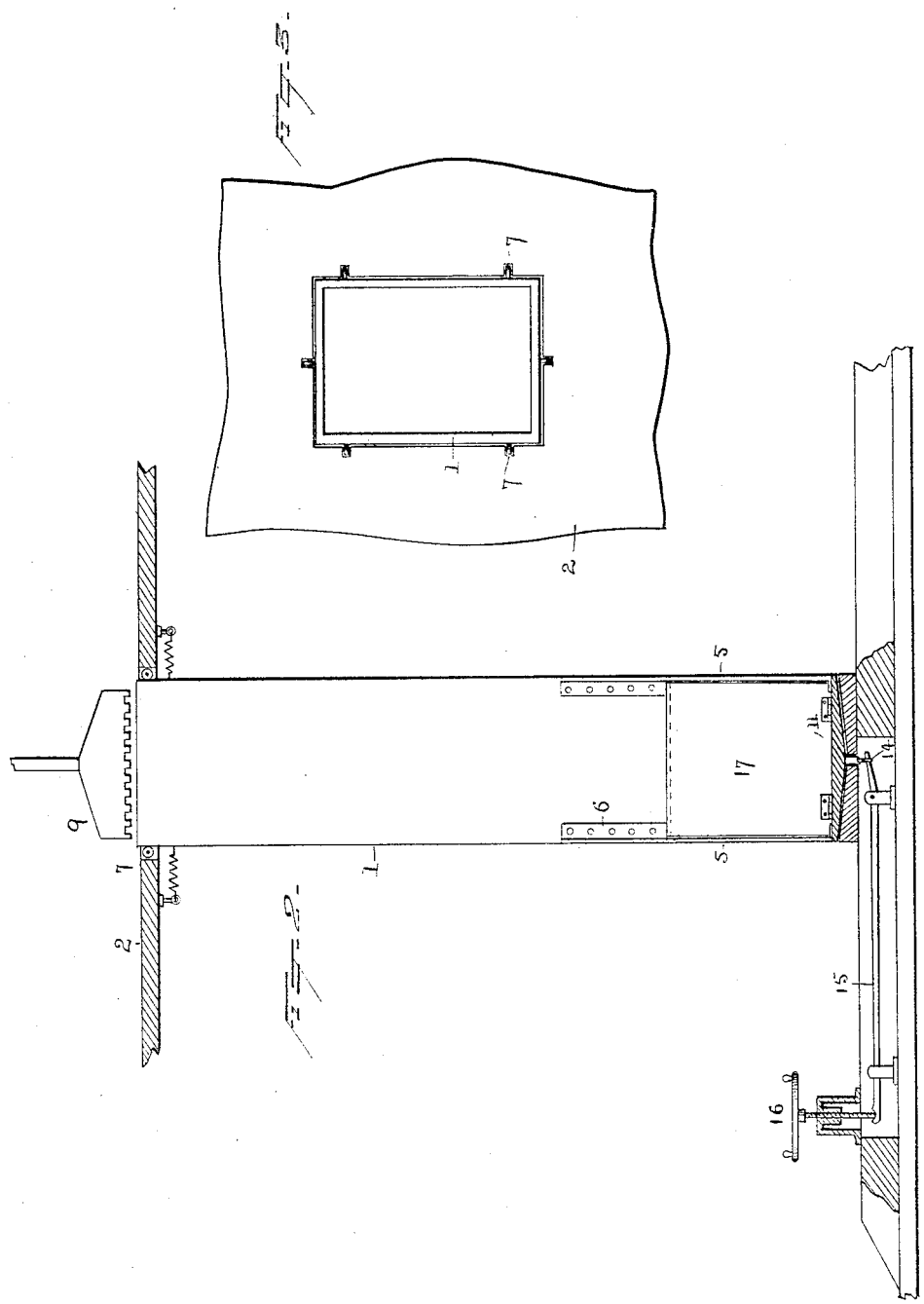
Witnesses
Norris A. Clark
W. Pelzer
Inventor
J. S. Watters.
By his Attorneys
Dyer & Seely.

UNITED STATES PATENT OFFICE.

JOHN S. WATTERS, OF THE UNITED STATES NAVY, ASSIGNOR OF ONE-THIRD TO FRANK EMMETT, OF NEW ORLEANS, LOUISIANA.

BALING AND WEIGHING SCALE.

SPECIFICATION forming part of Letters Patent No. 454,953, dated June 30, 1891.

Application filed October 7, 1890. Serial No. 367,307. (No model.)

*To all whom it may concern:*

Be it known that I, JOHN S. WATTERS, a citizen of the United States, ensign, United States Navy, have invented a certain new and useful Improvement in Cotton Boxes and Presses, of which the following is a specification.

It is common for farmers raising cotton to put the raw cotton up in rough bales at the farm or plantation and to transport it to a press, where it is thoroughly compressed and carefully baled. Owing to the fact that the farmers rely on their judgment as to the amount to put in each bale, the bales vary largely in weight, and this makes it necessary to weigh each bale and to keep track of the weight of each separate bale until it finally reaches the consumer. This evidently entails a great deal of trouble and expense. It would not be impossible to add or take away a quantity of cotton from each bale before it was put into the press for final baling; but this would be somewhat difficult and troublesome. I propose to automatically weigh the cotton during the preliminary baling on the farm or plantation, so that each bale as it goes to the press shall be of standard weight, and I accomplish this result by an apparatus somewhat similar to that which has been before suggested for baling hay, &c., which apparatus is of improved construction, as hereinafter fully pointed out and claimed.

In the accompanying drawings, which illustrate the invention, Figure 1 is a side view of an apparatus embodying my improvement. Fig. 2 is a view at right angles thereto, and Fig. 3 is a plan view of the cotton box or shaft.

The box or shaft 1, into which the loose cotton is thrown, preferably terminates at or adjacent to the floor 2 and extends downwardly nearly to the lower floor 3. Below the shaft is a platform 4, from which rise four metal or other suitable standards 5. One of these standards is connected to the shaft at each corner, preferably by means of a flange 6, which is bolted to the shaft. The standards may be cut away slightly below the shaft to make more space for the removal of the bale. The shaft passes loosely through the hatchway in the floor 2, being preferably guided by suitable rollers 7, and, if desirable, steadied by means of springs 8. Above the shaft, supported and operated in any suitable manner, is a plunger or platen 9 for compressing the cotton. Under the platform 4 is a solid base or foundation 10, on which the platform may rest. From the center of the platform a pin 11 projects downwardly and rests on a lever 12, as clearly shown in the drawings. At the bearing-point a steel block is preferably set into the iron lever to provide a more permanent and better support for the platform. The pin 11 is also usually made of steel. The lever forms a part of a suitable weighing apparatus 13, indicated at the right of the shaft. The upper scale-beam is supposed to be graduated from one to five hundred pounds in hundreds, and the lower beam is supposed to be graduated from one to one hundred in pounds; but this arrangement is not essential.

14 is the fulcrum of lever 12, and this fulcrum is movable by means of the lever 15 and screw 16 or by any other suitable means.

The space between the bottom of the shaft and the platform (which is a trifle longer than the height of a rough bale) is inclosed by doors or flaps 17, one for each side of the rectangular shaft, and which are preferably hinged at the bottom and have latches or other means near the top for holding them in place.

18 is an electric bell or other signal instrument, which is preferably placed above the upper floor and is connected by means of a circuit with the battery 19 and a circuit-controller at the weighing-machine. As shown in Fig. 1, the circuit from the battery leads to the fulcrum of the scale-beam. A spring 20 is arranged near to but insulated from the scale-beam, but in such position that when the scale-beam moves contact will be made and the circuit closed.

The manner of using this apparatus is as follows: The screw 16 is turned to raise the fulcrum 14 into contact with pin 11, thus raising the platform and the vertically-movable shaft 1 away from the base 10, on which it previously rested. One of the weights on the scale-beam is then adjusted to balance the platform and the superposed shaft. The other weight of the scale-beam is then placed at the point indicating the weight of cotton desired in the bale—say five hundred pounds. The loose cotton is then thrown into this shaft from the upper floor and falls through the shaft to the platform below. Since the shaft is freely movable in the vertical direction, the weight of cotton placed therein will be correctly indicated. This would not be the case were the shaft fixed in the usual manner by reason of the friction between the inner surface of the shaft and the cotton. When the proper amount of cotton has been introduced, the scale-beam tips, closing the circuit at 20 and ringing the alarm. This informs the workman that he should stop putting in cotton. The platen is then lowered, compressing all of the cotton into the space between the bottom of the shaft and the platform. This, however, should not be done until the screw 16 has been turned back, lowering the platform onto the solid foundation. The doors are then lowered, and the bagging, before the cotton is introduced, is laid upon the platform, and a second piece, which is placed over the cotton, is bound around the cotton, making a rough bale, which is technically called a "boxed bale." This is then slid out between the standards 5 and the doors again closed, when the apparatus is in condition for the reception of more cotton. This rough bale may then be transported to a suitable power-press, where it may be further compressed and neatly baled for transportation by rail or otherwise.

By this simple apparatus the difficulty heretofore mentioned is entirely overcome and great gain thereby effected.

Having thus described my invention, what I claim is—

1. The combination of a vertically-movable shaft for the reception of cotton, &c., a platform below the shaft, standards from the platform to the shaft for supporting the same, means for pressing the cotton below the bottom of the shaft, whereby it may be removed between the standards, and a weighing device supporting the platform, substantially as described.

2. The combination of a vertically-movable shaft for the reception of cotton, &c., a platform below the shaft, standards from the platform to the shaft for supporting the same, doors for inclosing the space between the platform and shaft, and a weighing device supporting the platform and shaft, substantially as described.

3. The combination, in an apparatus for baling cotton, &c., of a hollow shaft terminating at or near the level of a floor and freely movable vertically, means for compressing cotton in the shaft, a platform below the shaft and supporting the same, and a weighing device supporting the platform, substantially as described.

4. The combination of a hollow shaft for receiving cotton, &c., a platform supporting said shaft, a weighing device, means for connecting and disconnecting the weighing device to and from the platform, and means for compressing cotton in the shaft, substantially as described.

5. The combination of the shaft or box for the reception of cotton, &c., the platform below the shaft, the weighing-scale adapted to support the platform and shaft, and the movable fulcrum or pivot for the scale-lever, substantially as described.

6. The combination of a hollow shaft free to move vertically for the reception of cotton, the platform supporting said shaft, a rigid seat for the platform, and means for transferring the platform from the seat to the weighing device, substantially as described.

7. The combination of the vertically-movable shaft or box for the reception of cotton, &c., the weighing device supporting the shaft, the adjustable fulcrum for the weighing device, and the lever with means for moving it for raising or depressing the fulcrum, substantially as described.

8. The combination of a vertically-movable shaft for the reception of cotton, &c., a platform below the shaft and supporting the same, a weighing device supporting the platform and shaft, and an alarm operated by movement of the weighing device, substantially as described.

This specification signed and witnessed this 23d day of September, 1890.

JOHN S. WATTERS.

Witnesses:
CHAS. S. CLARK,
CHAS. M. HERO.